United States Patent [19]

Kitagawa et al.

[11] Patent Number: 5,153,239
[45] Date of Patent: Oct. 6, 1992

[54] EPOXY RESIN POWDER COATING CONTAINING IMIDAZOLE TRIMELLITATES

[75] Inventors: Katugi Kitagawa, Saitama; Akira Shinozuka, Chiba, both of Japan

[73] Assignee: Somar Corporation, Tokyo, Japan

[21] Appl. No.: 764,101

[22] Filed: Sep. 5, 1991

Related U.S. Application Data

[63] Continuation of Ser. No. 229,413, Aug. 8, 1988, abandoned.

[51] Int. Cl.$^5$ .................... C08L 63/02; C08L 63/04; C08L 63/06
[52] U.S. Cl. .................... 523/429; 525/486; 525/524; 525/526
[58] Field of Search .............. 525/524, 526, 486; 523/429

[56] References Cited

U.S. PATENT DOCUMENTS

| | | | |
|---|---|---|---|
| 3,523,037 | 8/1970 | Chellis | 525/524 |
| 3,842,035 | 10/1974 | Klaren | 525/533 |
| 3,962,184 | 6/1976 | Notomi et al. | 525/504 |
| 3,987,230 | 10/1976 | Gaku et al. | 428/457 |
| 4,007,299 | 2/1977 | Schulde et al. | 525/524 |
| 4,440,914 | 3/1984 | Helfand et al. | 525/482 |
| 4,757,117 | 7/1988 | Moss | 525/524 |
| 4,772,645 | 9/1988 | Tarbutton et al. | 523/457 |

FOREIGN PATENT DOCUMENTS

| | | | |
|---|---|---|---|
| 0057325 | 8/1982 | European Pat. Off. | 525/529 |
| 2105726 | 3/1983 | United Kingdom | 525/524 |

*Primary Examiner*—Robert E. Sellers
*Attorney, Agent, or Firm*—Sughrue, Mion, Zinn Macpeak & Seas

[57] ABSTRACT

An epoxy resin powder coating composition having excellent thermal resistance, mechanical strength, hardening speed and storage stability which comprises an epoxy resin mixture comprising a bisphenol type epoxy resin and a polyfunctional epoxy resin having at least three epoxy groups in the molecule; a hardener comprising a mixture of dicyandiamide and a compound represented by formula (I) below, and a filler:

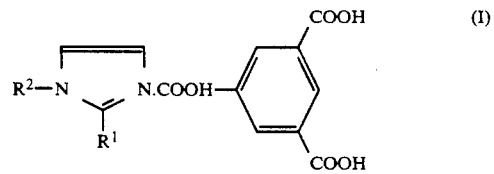

wherein, $R^1$ represents an alkyl group or an aryl group, and preferably represents a phenyl group from the view of storage stability; and $R^2$ represents a cyanoethyl group, a vinyl group, or a phenyl group.

The powder coating composition is suitably used in fixing stator coils or armature coils in motors or generators.

12 Claims, No Drawings

EPOXY RESIN POWDER COATING CONTAINING IMIDAZOLE TRIMELLITATES

This is a continuation of application Ser. No. 07/229,413 filed Aug. 8, 1988, now abandoned.

FIELD OF THE INVENTION

The present invention relates to an epoxy resin powder coating composition suitably used for fixing the stator coils or armature coils in motors or generators.

BACKGROUND OF THE INVENTION

Conventionally known is an epoxy resin powder coating composition prepared by mixing carboxylic anhydride as a hardener with an epoxy resin (e.g., Japanese Patent Application (OPI) Nos. 243168/85 and 89271/86). The term "OPI" as used herein means a published unexamined Japanese patent application. The aforesaid epoxy resin powder coating composition gives film having such excellent thermal resistance and mechanical strength that it has been used as an insulating coating compositions for electric and electronic parts. The coating composition, however, is highly hygroscopic and is apt to absorb moisture from the air. This impairs storage stability and lowers the hardening speed.

SUMMARY OF THE INVENTION

The present invention relates to a solution to the aforesaid problems encountered with conventional epoxy resin powder coating compositions.

That is, the present invention provides an epoxy resin powder coating composition suitably used for fixing coils, which comprises:

(A) an epoxy resin mixture comprising a bisphenol type epoxy resin and a polyfunctional epoxy resin having at least three epoxy groups per molecule thereof;

(B) a hardener comprising a mixture of dicyandiamide and a compound represented by formula (I):

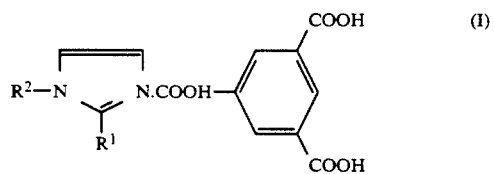

wherein, $R^1$ represents an alkyl group or an aryl group, and preferably represents a phenyl group from the view of storage stability; and $R^2$ represents a cyanoethyl group, a vinyl group, or a phenyl group; and (C) a filler.

DETAILED DESCRIPTION OF THE INVENTION

The epoxy resin used in the present invention comprises as essential ingredients, a bisphenol type epoxy resin and a polyfunctional epoxy resin having at least three epoxy groups per molecule thereof. There are two types of bisphenol type epoxy resins, bisphenol A type and bisphenol F type. The bisphenol A type is preferred.

Of the bisphenol A type epoxy resins, "Epikote" (trade name, manufactured by Yuka Shell Epoxy Co., Ltd.) is particularly preferred.

The number average molecular weight of the bisphenol type epoxy resin is generally in the range from about 800 to 6,000, preferably from about 1,000 to 3,000. Such bisphenol type epoxy resins can be prepared by mixing resins having an average molecular weight from about 900 to 3,000, preferably from about 1,300 to 1,700, with another resin having an average molecular weight from about 2,000 to 4,000, preferably from about 2,400 to 3,000.

Examples of polyfunctional epoxy resins having at least three epoxy groups in the molecule include novolak type epoxy resins (o-cresol novolak type, phenolic novolak type, etc.), triglycidyl ether type resins (epoxy compounds of cyanuric acid or triphenylpropane), tetraglycidyl ether type resins (epoxy compounds of bisphenol F, tetraoxytetraphenylethane, etc), and the like.

Of these, the novolak type epoxy resin is preferred since it has a low melt viscosity such that good melt flow and powder fluidity is maintained even when a large amount of powder is blended therewith.

Further, of the novolak-type epoxy resins, a phenolic novolak epoxy resin such as "EPPN" and an o-cresol novolak epoxy resin such as "EOCN" (trade names, both manufactured by Nippon Kayaku Co., Ltd.) are preferably used in the present invention.

The phenolic novolak type epoxy resin has an epoxy equivalent of, generally from 150 to 220, and preferably from 175 to 195. Further, the phenolic novolak type epoxy resin has a ring and ball softening point of generally from 65° to 75° C.

An epoxy equivalent of the o-cresol novolak type epoxy resin is generally from 200 to 300, and preferably from 215 to 245. Further, the o-cresol novolak type epoxy resin has a ring and ball softening point of generally from 70° to 100° C.

The amount of the polyfunctional epoxy resin to be added is from 35 to 85 parts by weight, preferably from 50 to 75 parts by weight, per 100 parts by weight of the total amount of epoxy resin.

The powder coating composition thus obtained is favorable in the point that they have good fluidity and excellent melt flow.

As the hardener for the present invention, dicyandiamide is used in combination with a compound represented by formula (I) below:

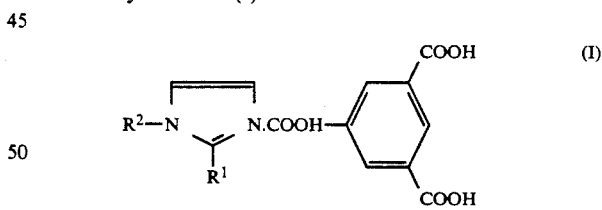

wherein, $R^1$ represents an alkyl group or an aryl group, and preferably represents a phenyl group for the purpose of maximizing storage stability; and $R^2$ represents a cyanoethyl group, a vinyl group, or a phenyl group, and preferably represents a cyanoethyl group.

Specifically, $R^1$ preferably represents an alkyl group having 1 to 20 carbon atoms or an aryl group having 6 to 20 carbon atoms. When $R^2$ is a cyanoethyl group, $R^1$ preferably represents an alkyl group having 11 to 17 carbon atoms or an aryl group (e.g., phenyl, tolyl, xylyl, etc.). The alkyl and aryl groups represented by $R^1$ may be substituted. Specific examples of the substituents are an alkyl group, an aryl group, an amino group, etc.

The point to be stressed in the present invention is that the hardener should be used in combination of dicyandiamide with the compound of formula (I). If dicyandiamide is used alone, the hardening speed of the powder coating composition obtained is too low. On the other hand, the powder coating composition hardens too rapidly when only the compound of formula (I) is used. The use of both in combination yields a hardener which enables an epoxy resin to have a moderate hardening speed. The use of both in combination also improves the adhesion strength of the powder coating composition. The amount of dicyandiamide used is generally from 5 to 70% by weight of the total amount of both, preferably from 10 to 60% by weight and more preferably from 10 to 40% by weight. The total amount of the hardener is from 4 to 15 parts, preferably from 6 to 9 parts by weight, per 100 parts by weight of the total amount of epoxy resin.

As the filler which are used in the present invention, common fillers such as silica, calcium carbonate, wollastanite (acicular calcium silicate), alumina, clay, mica, talc, powdered glass fiber, and powdered carbon fiber can be used. To obtain powder coating compositions showing less degradation in impact strength at prolonged use at high temperatures (high temperature impact strength), acicular fillers such as wollastonite and flaky fillers such as mica are preferred. It is difficult to obtain powder coating compositions having fairly high temperature impact strength if granular fillers such as calcium carbonates alone are used. The use of acicular or flaky fillers alone or in combination is a solution to such difficulties. The filler to be added is from 30 to 200 parts by weight, preferably from 40 to 150 parts by weight per 100 parts by weight of the total amount of epoxy resins. Acicular or flaky fillers are used from 20 to 100% by weight, preferably from 30 to 80% weight of the total addition amounts of the filler.

Other common auxiliary components used in powder coating compositions may also be used in appropriate amounts. Examples of such are leveling agents of acrylic acid ester oligomers, etc., pigments, and hardening accelerators.

Any standard method may be employed for blending the ingredients comprising the present epoxy resin powder coating composition. For example, the blend can be mixed with a mixer or the like, then kneaded with a kneader or the like, further melt-mixed with an extruder or the like, cooled to solidify, and ground to fine particles.

The epoxy resin powder coating composition of the present invention may be used for insulating electric or electronic equipment or parts. In particular, the present coating composition is suitably used for fixing the stator coils or armature coils in motors or generators.

The present invention is hereinafter described in greater detail with reference to examples, which are not to be construed as limiting the scope thereof. Unless otherwise indicated, all parts, percents and ratios are by weight.

EXAMPLE

Epoxy resin powder coating composition samples 1–9 of the composition (in parts by weight) as shown in Table 1 were prepared and subjected to performance tests. The results are shown in Table 1.

TABLE 1

| | Sample No. (parts by weight) | | | | | | | | |
|---|---|---|---|---|---|---|---|---|---|
| | 1 | 2* | 3 | 4 | 5 | 6 | 7* | 8* | 9* |
| Epikote 1007 | 20 | 20 | 20 | 20 | 20 | 20 | 20 | 20 | 20 |
| Epikote 1004 | 20 | 20 | 20 | 20 | 20 | 20 | 20 | 20 | 20 |
| Epikote 1002 | — | 60 | — | — | — | — | — | — | — |
| EPPN 201 | 40 | — | 40 | 40 | 40 | 40 | 40 | 40 | 40 |
| EOCN 104 | 20 | — | 20 | 20 | 20 | 20 | 20 | 20 | 20 |
| Wollastonite | 30 | 30 | — | — | 30 | 30 | 30 | 30 | — |
| Mica | — | — | 30 | — | — | — | — | — | 30 |
| Calcium carbonate | 30 | 30 | 50 | 100 | 30 | 30 | 30 | 30 | 50 |
| Leveling agent | 0.3 | 0.3 | 0.3 | 0.3 | 0.3 | 0.3 | 0.3 | 0.3 | 0.3 |
| Hardener A | 2 | 2 | 2 | 2 | 3 | 1 | 8 | — | 0.5 |
| Hardener B | 6 | 6 | 6 | 6 | 5 | 8 | — | 8 | — |
| BTDA | — | — | — | — | — | — | — | — | 52.5 |

| | Sample No. | | | | | | | | |
|---|---|---|---|---|---|---|---|---|---|
| | 1 | 2* | 3 | 4 | 5 | 6 | 7* | 8* | 9* |
| Impact strength (mm) | 300 | 400 | 300–350 | 250–300 | 350 | 350 | 250–300 | 250–300 | 200–250 |
| Heat resistance (°C.) | 450 | 240 | 480 | 400 | 480 | 490 | 300 | 450 | 450 |
| Flowability | 5 | 7 | 4 | 8 | 3–4 | 3 | 5–6 | 1.5–2.5 | 2 |
| Gel time** (sec) | 10 | 20–28 | 10–11 | 10–11 | 15 | 7 | 35 | 5–7 | 15 |
| Gel time*** (sec) | 8 | 18–20 | 9 | 8 | 13 | 5 | 32 | 3 | 3 |
| Film-forming property | A | D | A | B | A | C | D | D | C |
| Storage stability | Good | Good | Good | Good | Good | Good | Good | Poor | Poor |

*Comparative Example
**Immediately after producing
***After storage

The following are chemical descriptions for the components in Table 1.

Epikote 1007: a bisphenol-A type epoxy resin represented by general formula (II) described above (number average molecular weight: about 2,900, epoxy equivalent: 1750–2200), made by Yuka Shell Epoxy Co., Ltd.

Epikote 1004: a bisphenol-A type epoxy resin represented by general formula (II) described above (number average molecular weight: about 1,600, epoxy equivalent: 875–975), made by Yuka Shell Epoxy Co., Ltd.

Epikote 1002: a bisphenol-A type epoxy resin represented by general formula (II) described above (number average molecular weight: about 1,260, epoxy equivalent: 600–700), made by Yuka Shell Epoxy Co., Ltd.

EPPN 201: a phenolic novolak type epoxy resin represented by general formula (III) described above (softening point: 65°-75° C., epoxy equivalent: 175-195), made by Nippon Kayaku Co., Ltd.

EOCN 104: an o-cresol novolak type epoxy resin represented by general formula (IV) described above (softening point: 90°-100° C., epoxy equivalent: 225-245), made by Nippon Kayaku Co., Ltd.

Leveling agent: an acrylic acid ester oligomer

Hardener A: dicyandiamide

Hardener B: 1-cyanoethyl-2-phenylimidazole trimellitate:

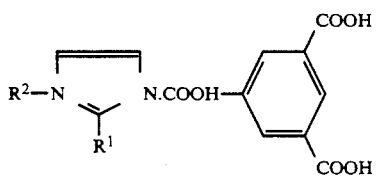

($R^1$:phenyl; $R^2$:cyanoethyl)

BTDA: benzophenonetetracarbonic anhydride.

The performance of the powder coating composition samples was evaluated using the methods and the standards as follows.

(1) Impact Strength

Preparation of the coated test piece: A soft steel plate of 60×60 mm and 3.2 mm thick was coated with the powder coating composition and thermoset to obtain a film of about 0.3 mm in thickness.

Measurements: A DuPont-type impact tester was employed. A semispherical striker of 1 kg weight having a head with a curvature radius of ¼ inch was dropped onto the above coated sample placed on the table having a semispherical hole with a curvature radii of about ¼ inch to concavely deform the plate, and the dropping distance necessary to break and peel off the coating was measured. Those samples having a length of 300 mm or longer were evaluated as having a fair impact strength.

(2) Thermal Resistance

A soft steel far with a diameter of 10 mm was powder coated to obtain a film having a thickness of about 0.3 mm. Bare copper wire was hung to the far, to which a 500 g load was applied. A buzzer- or lamp-operating circuit was constructed by applying a voltage of 100 V between the sample and the bare copper wire. The sample was heated at 3° C./min in the furance. If the buzzer or the lamp was on at a temperature of 420° C. or higher at which the coating broke by the boaded bare wire, the sample was considered to have fair thermal resistance.

(3) Gel Time

Gel time (second) was measured at the plate temperature of 200° C., according to the JIS C-2104 standardized method.

(4) Flowability and Film-Forming Property

Manufacturing of test pellets: 0.5 g of the powder coating composition was fed into a 13 mm diameter cylindrical metal mold and pressed under pressure of 20 kg/cm² to obtain a pellet with 13 mm in diameter and thickness of "T" mm.

Measurements: The pellet was mounted on a steel plate inclined at 45° C. and having been heated to 150° C. to let the melt flow. Gellation occurs within a short time and solidifies. The length of the solid in the direction of inclination, "F" mm, was measured after 20 to 30 minutes from the beginning of solidification to evaluate the flowability according to the following equatiion:

$$\text{Flowability} = \frac{F - 13}{T}$$

Further, in order to evaluate the film-forming property, the degree of gelation of the coating composition was observed.

The film-forming property is indicated by the following four stages A, B, C and D.

A: Uniform film on a steel plate is observed.
B: Almost uniform film on a steel plate is observed.
C: Film unevenness is partly observed on a steel plate.
D: Film unevenness is much observed on a steel plate.

In the above four stages, A, B and C are practicable.

(5) Storage Stability

The powder coating composition was stored under a constant temperature of 40° C. and a constant relative humidity of 80% for 7 days. The gel time was measured for the stored product and those maintaining 60% or more of the initial value were evaluated to have fair storage stability.

It is apparent from the results shown in Table 1 that Sample Nos. 2 and 7 are poor in film-forming property although they are excellent in storage stability, and Sample Nos. 8 and 9 are poor in storage stability. On the other hand, Sample Nos. 1 and 3-6 according to the present invention show well-balanced results.

While the invention has been described in detail and with reference to specific embodiments thereof, it will be apparent to one skilled in the art that various changes and modifications can be made therein without departing form the spirit and scope thereof.

What is claimed is:

1. An epoxy resin powder coating composition which comprises:
   (A) an epoxy resin mixture comprising a bisphenol epoxy resin and a polyfunctional epoxy resin having at least three epoxy groups per molecule thereof;
   (B) a hardener comprising a mixture of dicyandiamide and a compound represented by formula (I):

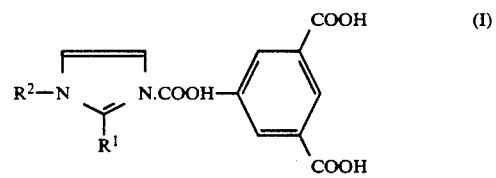

wherein $R^1$ represents an alkyl group or an aryl group, and $R^2$ represents a cyanoethyl group; and
   (C) a filler.

2. An epoxy resin powder coating composition as in claim 1, wherein said polyfunctional epoxy resin is a novolak epoxy resin. wherein n is degree of polymerization.

3. An epoxy resin powder coating composition as in claim 1, wherein said polyfunctional epoxy resin is present in an amount of from 35 to 85 parts by weight per 100 parts by weight of the total amount of epoxy resins present in said coating composition.

4. An epoxy resin powder coating composition as in claim 3, wherein the amount of polyfunctional epoxy resin is from 50 to 75 parts by weight per 100 parts by weight of the total amount of epoxy resins present in said coating composition.

5. An epoxy resin powder coating composition as in claim 1, wherein number average molecular weight of said bisphenol epoxy resin is in the range of from about 800 to 6,000.

6. An epoxy resin powder coating composition as in claim 5, wherein said number average molecular weight is from about 1,000 to 3,000.

7. An epoxy resin powder coating composition according to claim 1 wherein $R^1$ represents a phenyl group.

8. An epoxy resin powder coating composition according to claim 1, wherein said dicyandiamide is present in an amount of from 5 to 70% by weight of the total amount of hardener present in said coating composition.

9. An epoxy resin powder coating composition according to claim 8, wherein the amount of dicyandiamide is from 10 to 60% by weight of the total amount of hardener present in said coating composition.

10. An epoxy resin powder coating composition according to claim 1, wherein said hardener is present in an amount of from 4 to 15 parts by weight per 100 per parts by weight of the total amount of epoxy resins present in said coating composition.

11. An epoxy resin powder coating composition according to claim 1, wherein said filler is selected from the group consisting of wollastonite and mica.

12. An epoxy resin powder coating composition according to claim 11, wherein said filler is present in an amount of from 30 to 200 parts by weight per 100 parts by weight of the total amount of epoxy resins present in said coating composition.

* * * * *